Patented June 17, 1941

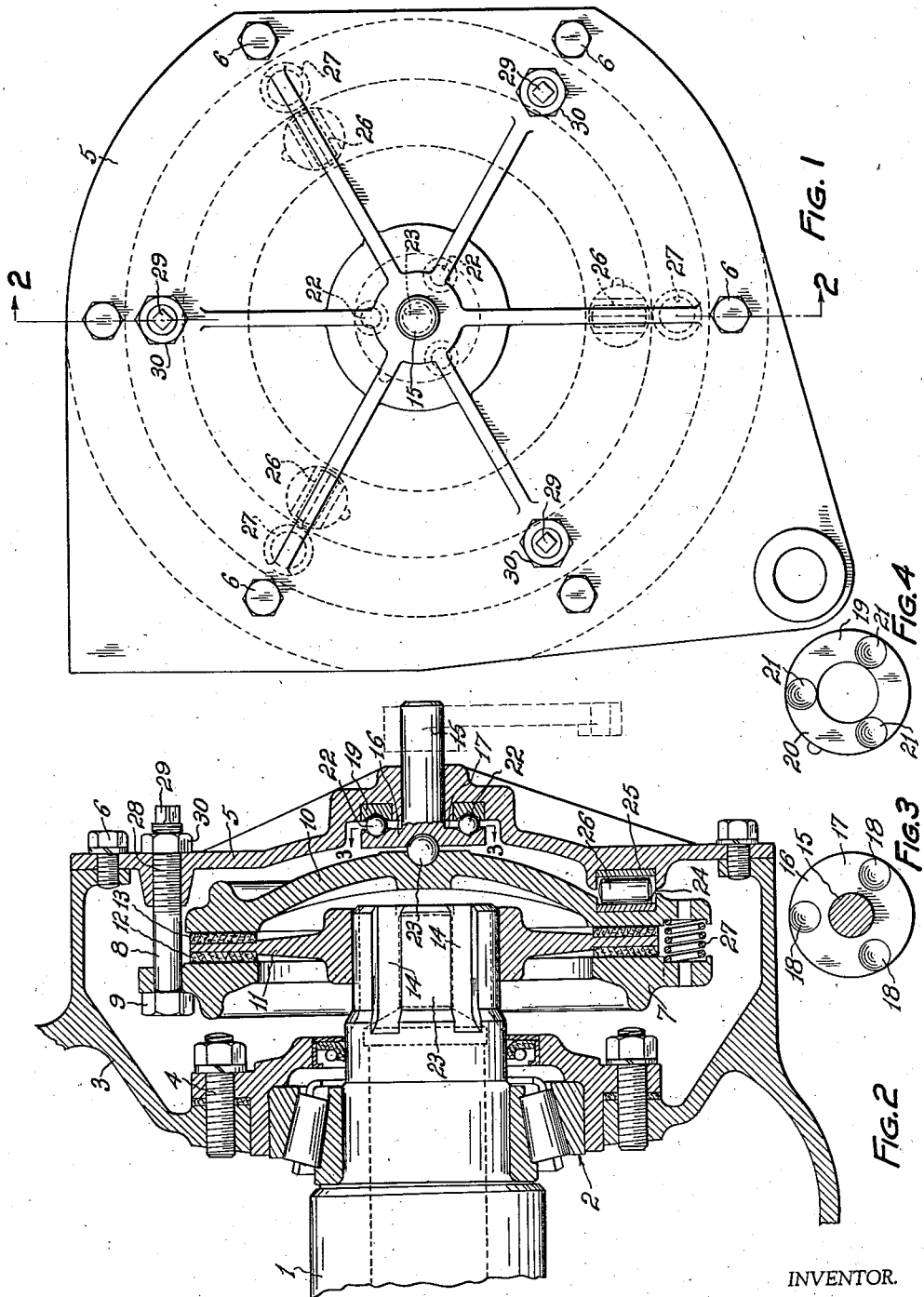

2,245,987

UNITED STATES PATENT OFFICE 2,245,987

BRAKE UNIT

Homer T. Lambert, St. Joseph, Mich.

Application March 2, 1940, Serial No. 322,025

11 Claims. (Cl. 188—72)

This invention relates to improvements in brake constructions of the disc type, and more particularly, to a novel arrangement of parts which may be readily applied to a rotatable shaft to which it is desired to apply a braking force.

One of the primary objects of this invention is to provide in a brake construction employing stationary and relatively axially movable cooperating brake discs, novel means for imparting the primary axial braking movement to the cooperating movable brake discs. More specifically, this improvement comprises stationary and rotatable camming discs axially aligned with respect to the brake discs and a centrally located anti-friction member for imparting axial camming movement from the camming discs to the axially movable brake discs.

A further object is to provide a novel arrangement of assembly parts by which the brake unit may be readily attached to and detached from a shaft to which it is desired to apply a braking action.

A further object is to provide a novel form of adjustable support for the relatively stationary brake part or disc and by which the stationary brake disc may be readily adjusted axially with respect to its cooperating brake parts to compensate and take up for wear between such brake parts.

Other objects and advantages of the invention will become apparent during the course of the following description.

In the drawing, there is shown a preferred embodiment of the invention. In this showing—

Figure 1 is an end elevational view showing a brake unit in operative position and showing the supporting plate of the brake unit which carries the brake parts and by which the brake unit is attached to the housing in which the member to be braked is mounted, dotted lines diagrammatically showing the positions of certain parts of the brake mechanism.

Figure 2 is a vertical sectional view of the brake unit taken substantially on the line 2—2 of Figure 1.

Figure 3 is a sectional view of the rotatable camming disc taken on the line 3—3 of Figure 2; and, Figure 4 is an end elevational view of one face of a stationary camming disc.

Referring to the drawing, the numeral 1 indicates a shaft rotatably mounted in a bearing unit, indicated as a whole by the numeral 2, the bearing unit 2 being secured to a housing 3 by means of bolts 4. The shaft 1 may be a rotatable transmission shaft or other conventional rotatable element to which it is desired to apply a braking force. A supporting plate 5 is removably secured to the housing 3 by means of a plurality of bolts 6. Within the housing 3 and spaced inwardly of the supporting plate 5, a stationary braking disc 7 is carried by supporting bolts 8 secured to the supporting plate 5 in a manner to be described. As will be apparent from Figure 1, three of such supporting bolts 5 are provided although a greater number may be employed if desired. It will be noted that movement of the stationary brake disc 7 away from the supporting plate 5 is prevented by the heads 9 of the supporting bolts 8.

A relatively axially movable brake disc 10 is mounted between the stationary brake disc 7 and the supporting plate 5. Intermediate the brake disc 7 and the brake disc 10, there is provided a rotary braking member 11 having annular frictional brake facings 12 and 13 mounted thereon and respectively engageable with the braking surfaces of the stationary brake disc 7 and the movable brake disc or pressure plate 10 to effect a braking action in a manner to be described. The braking member 11 is provided with splines engageable in splined grooves 14 formed in the shaft 1 so as to be rotatable with the shaft 1 and axially movable with respect thereto.

In order to effect primary axial movement of the movable brake disc or pressure plate 10 into braking engagement with the braking member 11, there is provided an actuating member 15 to which a rotatable camming disc 16 is integrally secured. As best shown in Figure 3, the face 17 of the rotatable camming disc is provided with three conical recesses 18. For cooperating with the rotatable camming disc 16, a stationary camming disc 19 is mounted in the support 5 and the face 20 of this disc adjacent the face 17 of the rotary camming disc 16 is likewise provided with three conical recesses 21.

Each of the recesses 18 is normally adapted to lie opposite a similar recess 21 and anti-frictional spherical camming members 22 are mounted in each of such opposed pair of recesses, as best shown in Figure 2. Upon a rotating movement being imparted to the operating member 15, the anti-friction members 22 will be shifted about the axes of the camming discs 16 and 19 and will ride up the inclined surfaces of the conical recesses 18 and 21 and impart an axial camming movement to the rotatable camming disc 16. The rotatable member 15 is slidably mounted in the support 5 to permit the axial camming movement of the camming disc 16. The connections for imparting rotation to the actuating member 15 are not shown in the drawing, it being understood that any suitable form of connection may be employed for this purpose.

The rotatable camming disc 16 is connected to the movable brake disc or pressure plate 10 by a single spherical anti-friction member 23. As shown in Figure 2, the camming disc 16 and the pressure plate 10 are provided with opposed spherical segmental recesses to provide bearing surfaces or seats in which the anti-friction member 23 is mounted. In this manner, upon axial movement of the rotatable camming disc 16, such movement will be imparted directly to the pressure plate 10. It will be noted that the actuating member 15 is located centrally of the support 5 and that the camming discs 16 and 19 and the brake parts of the mechanism have a common axis. It will also be noted that the anti-friction member 23 is located centrally of the pressure plate 10 and that the common axis of the parts referred to passes through the center of the anti-friction member 23. In this manner, the primary axial moving force is applied to the pressure plate 10 centrally thereof and such member will be moved uniformly into engagement with the braking member 11; the anti-friction member 23 permitting the braking surface of the pressure plate 10 to align with the braking surface of the frictional braking member 13.

Servo mechanism is provided for applying an auxiliary braking force to the pressure plate 10 which utilizes the energy in the parts to which the braking action is being applied for exerting an additional force on the pressure plate 10. This mechanism comprises inserts 24 and 25 respectively mounted in recesses in the pressure plate 10 and the supporting plate 5. Cam grooves are formed in the inserts 24 and 25 and anti-friction camming members 26 are mounted between the inserts 24 and 25.

Upon initial engagement of the pressure plate 10 with the rotary braking member 11, there will be a frictional drag on the pressure plate 10 tending to rotate it relative to the support 5 and such movement will cause the anti-friction camming members 26 to ride up the inclined surfaces of the inserts 24 and 25 and exert additional force upon the pressure plate 10 in a manner well known in the art.

I prefer that the insert 25 be rotatably mounted in the support 5 to prevent a binding action which occurs where both of the inserts are fixedly mounted in their respective recesses.

Springs 27 are provided for effecting movement of the pressure plate 10 out of braking engagement after a braking action. As indicated by the dotted lines in Figure 1, there is provided three of the springs 27 and three of the camming members 26 together with associated inserts. However, since the operation of these elements is well known in the art, it will be understood that I do not wish to be limited to the exact form or number of these elements as shown in the drawing.

In order that an adjustment may be made of the stationary brake disc 7, the supporting bolts 8 are threaded as at 28 for engagement with threads formed in the supporting plate 5. The ends 29 of the supporting bolts 8 located outwardly of the supporting plate 5 are square for engagement with a suitable tool to be used in imparting a turning movement to the bolts 8. By reason of the threaded engagement of the bolts 8 with the supporting plate 5, it will be apparent that upon turning movement being imparted to the bolts 8, the stationary brake disc will be shifted axially with respect to the brake members 10 and 11 to compensate and take up for wear. Lock nuts 30 are provided for preventing turning movement of the supporting bolts 8 after they have been properly adjusted.

It will be noted that the brake parts are held in position with respect to the supporting member 5 and that they may be removed as a unit from the casing 3 and shaft 1. To effect this removal, it is merely necessary to remove the bolts 6 and withdraw the supporting plate 5 from the housing 3, the spline connection of the rotary braking member 11 with the shaft 14 permitting endwise movement of the braking member 11 on the shaft 1.

Since the operation of the braking unit will be apparent from the foregoing, it will be sufficient to point out that upon rotation of the shaft 15, the rotary camming disc will be moved inwardly toward the pressure plate 10. Such movement will be imparted to the pressure plate 10 through the anti-friction member 23 and will move the pressure plate 10 into initial frictional engagement with the braking member 11. Initial frictional engagement of the pressure plate 10 with the braking member 11 will cause a relative rotational movement of the pressure plate 10 with respect to the supporting plate 5. This relative movement of the pressure plate 10 will cause the camming rollers 26 to exert an additional force on the pressure plate 10 urging the same into tighter engagement with the braking member 11. By reason of the provision of the anti-friction member 23 connecting the primary actuating member 15 to the pressure plate 10, and the servo action of the camming rollers 26, it will be apparent that only a slight force need be applied to the primary actuating member 15 to effect a substantially large braking force on the rotary brake member 11.

Having thus described my invention, what I claim as new and desire to secure by Letters Patent of the United States, is:

1. Brake mechanism of the class described comprising in combination, relatively movable and stationary braking discs, and means for axially shifting said discs relatively into frictional contact to produce a braking action comprising an actuating member movable axially of the movable brake disc, and thrust means intermediate the actuating member and movable brake disc and at the axial center of the latter for transmitting movement from said actuating member to said relatively movable brake disc, and means at the periphery of the stationary braking disc for resisting the axial pressure of the thrust means aforesaid.

2. Brake mechanism of the class described comprising in combination, relatively movable and stationary braking discs, and means for axially shifting said disc relatively into frictional contact to produce a braking action comprising an actuating member and an anti-friction element for transmitting movement from said actuating member to said relatively movable brake disc, said anti-friction element comprising a single steel ball having engagement with said actuating member and said movable brake disc and occupying a position in axial alignment with said movable brake disc.

3. Brake mechanism of the class described comprising in combination, relatively movable and stationary braking discs, and means for axially shifting said discs relatively into frictional contact to produce a braking action comprising an actuating member having rotatable and axially movable parts and means for effecting axial movement of said axially movable part on rotation of said rotatable part and an anti-friction thrust element arranged to initiate operation of the last-named means by pressure at the axial center of the movable braking disc for transmitting axial movement of said actuating member to said relatively movable brake disc.

4. Brake mechanism of the class described comprising in combination, relatively movable and stationary braking discs, and means for axially shifting said discs relatively into frictional contact to produce a braking action comprising an actuating member having rotatable and axially movable parts and means for effecting axial movement of said axially movable part on rotation of said rotatable part and an anti-friction element for transmitting axial movement of said actuating member to said relatively movable brake disc, said anti-friction element comprising a single steel ball having engagement with said axially movable part and said movable brake disc and occupying a position in axial alignment with the axis of said movable brake disc.

5. Brake mechanism of the class described comprising in combination, relatively movable and stationary braking discs, and means for axially shifting said discs relatively into frictional contact to produce a braking action comprising a rotatable actuating member, and means for effecting axial movement of said actuating member on rotation thereof, and an anti-friction element for transmitting axial movement from said actuating member to said movable brake disc, said anti-friction member occupying a position in axial alignment with the axes of said actuating member and said movable brake disc.

6. Brake mechanism as claimed in claim 5 wherein said anti-friction element comprises a single steel ball and said actuating member and said movable brake disc are provided with opposed spherical segmental recesses providing bearing seats for the reception of said steel ball.

7. Brake mechanism of the class described comprising in combination, a housing, and a brake unit comprising a closure member removably secured to said housing and inwardly projecting studs extending from said member, a stationary brake disc carried by said studs, a relatively axially movable brake disc between said stationary brake disc and said closure member, a rotary brake member between said brake discs, rotary actuating means mounted on said closure member having a pressure head at one end for shifting said movable brake disc for imparting an axial movement thereto into frictional contact with said brake member to produce a braking action, means intermediate the pressure head and the closure member for effecting actuation of the actuating means upon rotation of the latter, a shaft rotatably mounted in said housing and having a splined connection with said rotary brake member permitting disengagement therewith upon axial movement of said brake member with respect to said shaft, said brake unit being detachable in its entirety from said housing upon removal of said closure member from said housing.

8. Brake mechanism of the class described comprising, in combination, a brake housing, a relatively stationary brake member carried by said housing, a rotary brake member in said housing, and means for shifting the rotary brake member into frictional contact with said stationary brake member to produce a braking action comprising a pair of discs having camming surfaces, the axes of said discs coinciding with the axis of said rotary brake member, anti-friction members between said discs and engageable with said camming surfaces, and actuating means for rotating one of said discs relative to the other connected to one disc and passing through the other disc to shift said anti-friction members about the axes of said discs and produce a camming action to move said rotary brake member into engagement with said stationary brake member.

9. Brake mechanism of the class described comprising in combination, a brake housing, a rotary brake member in said housing, an axially movable brake disc at one side of said brake member, and means for moving said brake disc into frictional contact with said brake member to produce a braking action comprising a pair of discs having camming surfaces, the axes of said discs coinciding with the axis of said rotary brake member, anti-friction members between said discs and engageable with said camming surfaces, means for rotating one of said discs relative to the other to shift said anti-friction members about the axes of said discs to produce an axial camming movement of one of said discs, and a single spherical anti-friction member for transmitting said axial camming movement to said movable brake disc, said last mentioned camming disc and said movable brake disc being provided with opposed spherical segmental recesses lying in the axis of said rotary brake member and providing bearing seats for the reception of said anti-friction member.

10. Brake mechanism of the class described comprising in combination, a brake housing, a rotary brake member in said housing, an axially movable brake disc at one side of said brake member, and means for moving said brake disc into frictional contact with said brake member to produce a braking action comprising a stationary camming disc mounted on said housing, a rotatable camming disc, the axes of said camming discs coinciding with the axis of said rotary brake member, said camming discs being provided with a plurality of pairs of opposed conical shaped camming recesses, each pair of conical recesses having a spherical anti-friction element mounted therein, means for rotating said rotatable camming disc to shift said anti-friction elements about the axes of said discs to produce an axial camming movement, and a single spherical anti-friction member for transmitting said axial camming movement to said movable brake disc, said last mentioned camming disc and said movable brake disc being provided with opposed spherical segmental recesses lying in the axis of said rotary brake member and providing bearing seats for the reception of said anti-friction member.

11. Brake mechanism as set forth in claim 5, wherein the anti-friction member comprises a single ball element supportingly holding the movable brake disc in centralized position.

HOMER T. LAMBERT.